United States Patent
Eller et al.

(10) Patent No.: US 10,276,923 B1
(45) Date of Patent: Apr. 30, 2019

(54) WIRELESS COMMUNICATIONS DEVICE WITH ANTENNA ELEMENT ID AND RELATED DEVICES AND METHODS

(71) Applicant: Harris Global Communications, Inc., Rochester, NY (US)

(72) Inventors: Andrew J. Eller, Naples, NY (US); Kenneth P. Beghini, Hilton, NY (US)

(73) Assignee: HARRIS GLOBAL COMMUNICATIONS, INC., Albany, NY (US)

( * ) Notice: Subject to any disclaimer, the term of this patent is extended or adjusted under 35 U.S.C. 154(b) by 0 days.

(21) Appl. No.: 16/104,383

(22) Filed: Aug. 17, 2018

(51) Int. Cl.
- H01Q 1/24 (2006.01)
- H01Q 1/48 (2006.01)
- H04B 1/38 (2015.01)
- H01Q 1/27 (2006.01)
- H05F 3/02 (2006.01)
- H01Q 1/50 (2006.01)

(52) U.S. Cl.
CPC ............... H01Q 1/24 (2013.01); H01Q 1/273 (2013.01); H01Q 1/48 (2013.01); H04B 1/38 (2013.01); H05F 3/02 (2013.01); H01Q 1/241 (2013.01); H01Q 1/242 (2013.01); H01Q 1/50 (2013.01)

(58) Field of Classification Search
CPC ... H04B 1/18; H04B 1/38; H01Q 1/50; H01Q 1/273; H01Q 1/48; H01Q 1/1207; H01Q 1/22; H01Q 1/2258; H01Q 1/24; H01Q 1/241; H01Q 1/242; H05F 3/02
See application file for complete search history.

(56) References Cited

U.S. PATENT DOCUMENTS

| | | | | |
|---|---|---|---|---|
| 6,064,868 A * | 5/2000 | Kobayashi | ............... | H03H 7/40 455/193.1 |
| 6,928,281 B2 * | 8/2005 | Ward | ..................... | H01Q 23/00 455/13.3 |
| 7,039,356 B2 * | 5/2006 | Nguyen | ............... | H04B 7/0691 455/13.3 |
| 7,171,223 B2 * | 1/2007 | Herscovich | ............ | H04B 7/061 455/101 |
| 2004/0257284 A1 * | 12/2004 | Rada | ..................... | H01Q 1/241 343/702 |
| 2007/0010217 A1 | 1/2007 | Takahashi et al. | | |
| 2008/0233890 A1 | 9/2008 | Baker | | |

(Continued)

*Primary Examiner* — Devan A Sandiford
(74) *Attorney, Agent, or Firm* — Allen, Dyer, Doppelt + Gilchrist, P.A.

(57) ABSTRACT

A wireless communications device may include an RF transceiver. The RF transceiver may have a first connector, an RF transceiver circuit coupled to the first connector, and a probe circuit coupled to the first connector and configured to place a DC supply voltage on the first connector. The wireless communications device may include an RF antenna assembly to be coupled with the RF transceiver. The RF antenna assembly may have a second connector configured to be mated with the first connector, an RF antenna element coupled to the second connector, and an antenna ID circuit coupled to the second connector and configured to be powered from the DC supply voltage and modulate the DC supply current indicative of an ID of the RF antenna element. The probe circuit may be configured to determine the ID of the RF antenna element based upon the modulated DC supply current.

22 Claims, 5 Drawing Sheets

(56) References Cited

U.S. PATENT DOCUMENTS

| | | | |
|---|---|---|---|
| 2009/0027282 A1* | 1/2009 | Finn | H01Q 21/00 343/703 |
| 2016/0173172 A1* | 6/2016 | Greene | H04B 7/0404 455/562.1 |
| 2017/0201283 A1* | 7/2017 | Desurvire | G01R 33/04 |

* cited by examiner

WIRELESS COMMUNICATIONS DEVICE WITH ANTENNA ELEMENT ID AND RELATED DEVICES AND METHODS

TECHNICAL FIELD

The present disclosure relates to the field of communications, and, more particularly, to wireless communications devices and related methods.

BACKGROUND

Mobile communications devices have become an integral part of society over the last two decades. Mobile communications devices are deployed to government personnel, and emergency service providers. In some applications, the mobile communications device is handheld, but in other applications, the mobile communications device may be more bulky, yet still portable, such as a manpack radio, as available from the Harris Corporation of Melbourne, Fla. The typical mobile communications device includes an antenna, and a transceiver coupled to the antenna. The transceiver and the antenna cooperate to transmit and receive communications signals.

Before transmission, the typical mobile communications device modulates digital data onto an analog signal. As will be readily appreciated by the skilled person, there is a plurality of modulations available for most applications.

For most communications devices, the transmitted and received signals are spectrally limited. In other words, the communications device operates within an expected frequency range, such as the ultra high frequency (UHF) range or the very high frequency (VHF) range. Because of the known operational characteristic, the communications device is usually designed to operate within the expected frequency range. Nevertheless, as communications devices have become more robust in the included feature set, some applications demand operating within multiple frequency bands, i.e. a multi-band device.

In some multi-band devices, such as the aforementioned manpack radio, the transmit/receive architecture may comprise a plurality of paths with respective amplifiers/receivers and antennas. To accommodate the multiple antennas, the radio device includes a plurality of antenna connection ports. Because of this, when the user assembles the radio device, the wrong antenna may be inadvertently inserted into a particular port. Indeed, this issue can be aggravated in devices with configurable or assignable ports (i.e. hot swappable antenna ports).

SUMMARY

Generally, a wireless communications device may include a radio frequency (RF) transceiver. The RF transceiver may include at least one first connector, an RF transceiver circuit coupled to the at least one first connector, and a probe circuit coupled to the at least one first connector and configured to place a direct current (DC) supply voltage on the at least one first connector. The wireless communications device may comprise an RF antenna assembly to be coupled with the RF transceiver. The RF antenna assembly may include a second connector configured to be mated with the at least one first connector, an RF antenna element coupled to the second connector, and an antenna identification (ID) circuit coupled to the second connector and configured to be powered from the DC supply voltage and modulate a DC supply current indicative of an ID of the RF antenna element. The probe circuit may be configured to determine the ID of the RF antenna element based upon the modulated DC supply current.

In some embodiments, the antenna ID circuit may include a voltage-controlled current source coupled to the second connector, and a controller configured to control the voltage-controlled current source based upon the ID of the RF antenna element. The antenna ID circuit may comprise a first inductor coupled between the second connector and the controller, and a first electrostatic discharge (ESD) device coupled between the first inductor and a reference voltage. The antenna ID circuit may comprise a DC level translator coupled between the first inductor and the controller. The at least one first connector may comprise a plurality of first connectors.

The probe circuit may comprise a second inductor coupled to the at least one first connector, a sense resistor coupled to the second inductor, and a current sensor coupled to the sense resistor. The probe circuit may comprise a controller coupled to the current sensor and configured to determine the ID of the RF antenna element based upon the modulated DC supply current. The probe circuit may comprise a switch coupled to the second inductor and configured to selectively apply the DC supply voltage to the at least one first connector. The probe circuit may comprise a second ESD device coupled between the second inductor and a reference voltage.

Another aspect is directed to an RF transceiver device comprising at least one first connector, an RF transceiver circuit coupled to the at least one first connector, and a probe circuit coupled to the at least one first connector and configured to place a DC supply voltage on the at least one first connector. The RF transceiver device may be coupled to an RF antenna assembly comprising a second connector configured to be mated with the at least one first connector, an RF antenna element coupled to the second connector, and an antenna ID circuit coupled to the second connector and configured to be powered from the DC supply voltage and modulate a DC supply current indicative of an ID of the RF antenna element. The probe circuit may be configured to determine the ID of the RF antenna element based upon the modulated DC supply current.

Another aspect is directed to an RF antenna assembly to be coupled with an RF transceiver. The RF transceiver may include at least one first connector, an RF transceiver circuit coupled to the at least one first connector, and a probe circuit coupled to the at least one first connector and configured to place a DC supply voltage on the at least one first connector. The RF antenna assembly may comprise a second connector configured to be mated with the at least one first connector, an RF antenna element coupled to the second connector, and an antenna ID circuit coupled to the second connector and configured to be powered from the DC supply voltage and modulate a DC supply current indicative of an ID of the RF antenna element. The probe circuit may be configured to determine the ID of the RF antenna element based upon the modulated DC supply current.

Yet another aspect is directed to a method of operating a wireless communications device comprising an RF transceiver. The RF transceiver may include at least one first connector, an RF transceiver circuit coupled to the at least one first connector, and a probe circuit coupled to the at least one first connector. The wireless communications device may comprise an RF antenna assembly comprising a second connector, an RF antenna element coupled to the second connector, and an antenna ID circuit coupled to the second connector. The method may include coupling the RF antenna assembly with the RF transceiver by mating the second connector with the at least one first connector, and operating the probe circuit to place a DC supply voltage on the at least one first connector. The method may comprise operating the antenna ID circuit to be powered from the DC supply voltage and modulate a DC supply current indicative of an ID of the RF antenna element, and determining the ID of the RF antenna element based upon the modulated DC supply current.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

In some approaches, radio devices with multiple antenna ports were able to detect whether an antenna was properly connected to a respective port, i.e. a properly seated connection. Nevertheless, these approaches did not provide feedback to the user on whether the antenna was the proper antenna for the respective port. In some approaches, the antennas and ports are colored coded to indicate placement, but this approach is fixed and poorly suited for configurable antenna port applications.

In some approaches, the user checks for proper antenna installation by reviewing Voltage Standing Wave Ratio (VSWR) readings for the antenna. The problem with this approach is that it may provide false bad placement indications for the connected antenna, since this reading can be affected by conductive materials near the antenna and physical damage to the antenna.

Referring to FIGS. 1-4, a wireless communications device 10 according to the present disclosure is now described. The wireless communications device 10 illustratively includes an RF transceiver 11. The RF transceiver 11 includes a plurality of first connectors 12a-12c, and a plurality of RF antenna assemblies 15a-15c that can be coupled to the plurality of first connectors. As will be appreciated, the wireless communications device 10 is a multi-band communications device, and each of the plurality of RF antenna assemblies 15a-15c is resonant (i.e. an effective RF radiator) at a respective operational frequency band.

Figure 1:
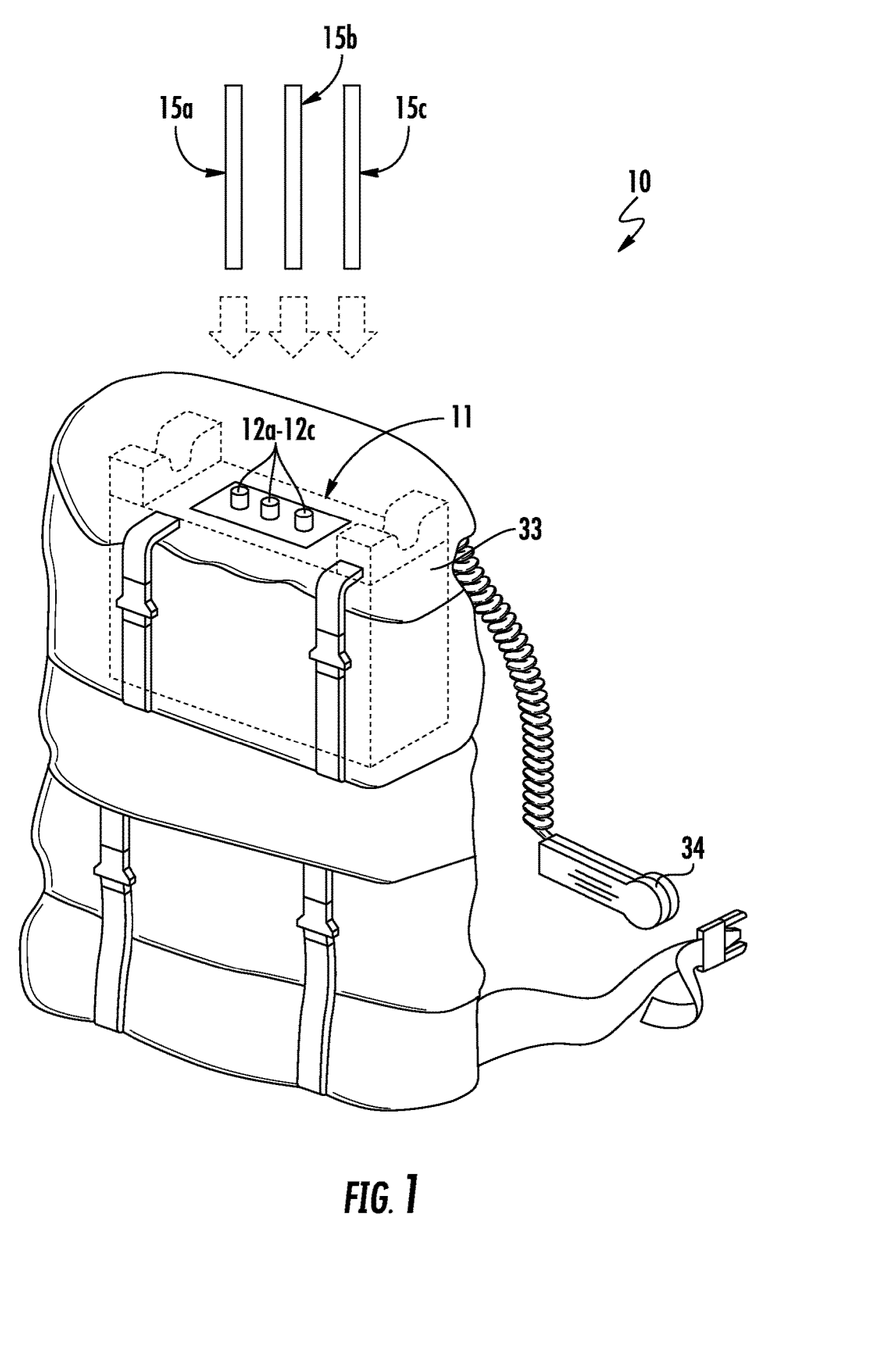
FIG. 1 is a schematic diagram of a first example embodiment of a wireless communications device, according to the present disclosure.
Figure 2:
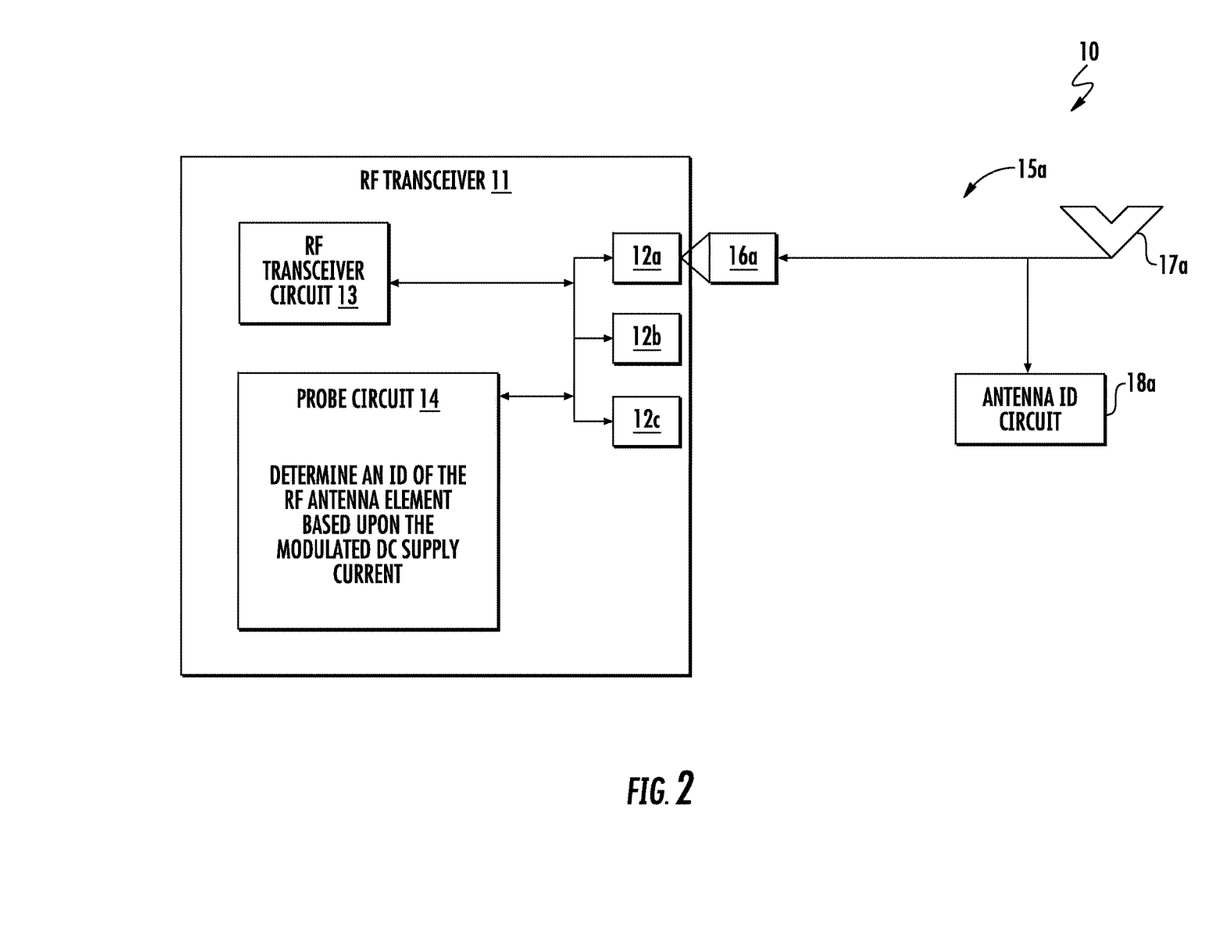
FIG. 2 is a more detailed schematic block diagram of the first example embodiment of the wireless communications device, according to the present disclosure.

Also, for drawing clarity, the plurality of first connectors 12a-12c is three in number in FIGS. 1-2, but of course, this is merely exemplary. The number of first connectors 12a-12c may be any number. Also, although FIG. 3 only shows a single RF antenna assembly 15a in detail, it should be appreciated that all of the plurality of RF antenna assemblies 15a-15c may be constituted similarly, or may each comprise different embodiments of the present disclosure.

For example, a plurality of operational frequency bands may comprise the following frequency ranges: 30-520 MHz, 225-2600 MHz, and 30-2600 MHz. In this exemplary listing, the plurality of operational frequency bands extends within the very high frequency (VHF), and ultra high frequency (UHF) bands, but of course, these frequency ranges are merely exemplary in nature, and other frequency bands can be used.

Also, each of the plurality of first connectors may comprise one or more of a threaded Neill-Concelman (TNC) RF connector. Of course, this connector type is exemplary, and other connector formats can be used.

In the illustrated embodiment, the wireless communications device 10 includes a housing 33 carrying the RF transceiver 11, and a handset 34 coupled to the housing of the RF transceiver. Here, the housing 33 illustratively comprises a manpack radio form factor, as available from the Harris Corporation of Melbourne, Fla. Of course, this embodiment is merely exemplary, and other housing types can be used, such as a handheld housing form factor. Furthermore, it should be appreciated that the manpack radio form factor can be used in many applications, such as installation in vehicles. Indeed, any communications device with multiple antenna connections can be modified with the features of the present disclosure.

Figure 3:
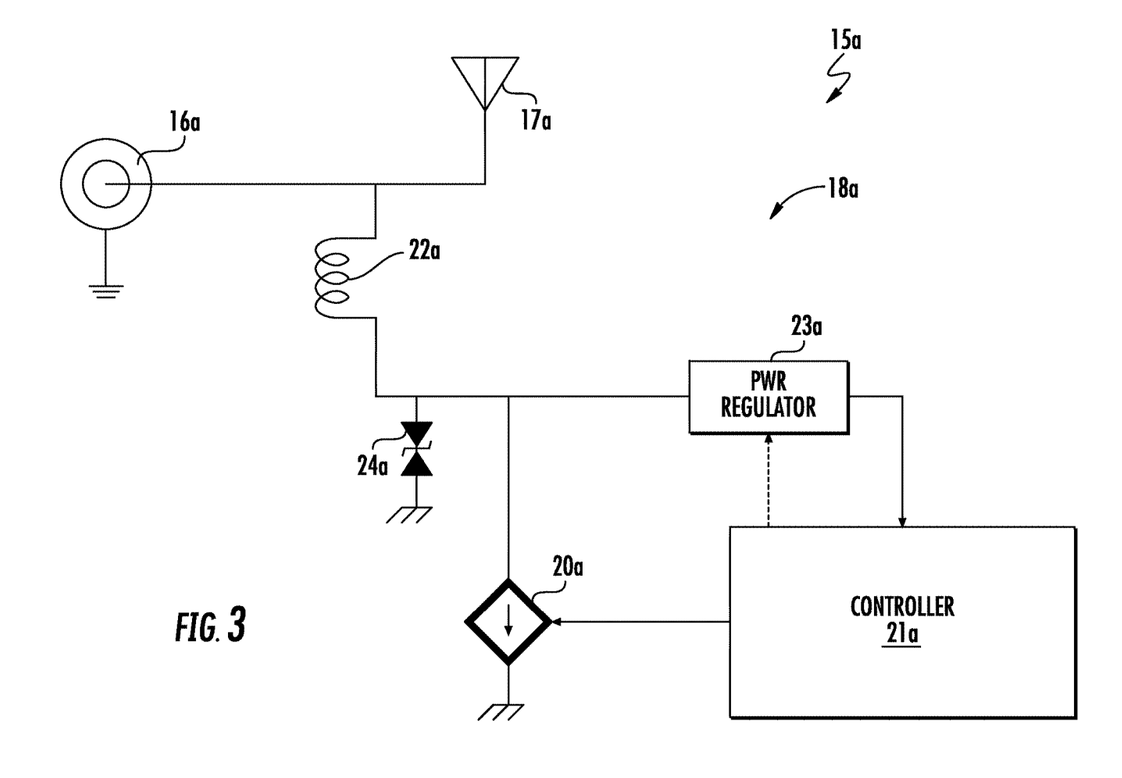
FIG. 3 is a schematic diagram of a first embodiment of an RF antenna assembly from the wireless communications device of FIG. 1 or 2.

Each of the plurality of RF antenna assemblies 15a-15c illustratively includes a second connector 16a configured to be mated with one of the plurality of first connectors 12a-12c. Each second connector 16a illustratively comprises a TNC connector. Of course, this connector type is exemplary, and other connector formats can be used.

Each of the plurality of RF antenna assemblies 15a-15c illustratively includes an RF antenna element 17a coupled to the second connector 16a. As will be appreciated, the RF antenna element 17a is configured to be an efficient radiator for the respective operational frequency.

Each of the plurality of RF antenna assemblies 15a-15c illustratively includes an antenna ID circuit 18a coupled to the second connector 16a. The antenna ID circuit 18a is configured to be powered from the DC supply voltage and modulate a DC supply current indicative of an ID of the RF antenna element 17a.

Additionally, the antenna ID circuit 18a illustratively includes a first inductor 22a coupled to the second connector 16a. As will be appreciated, the first inductor 22a is configured to block RF signals from passing into the antenna ID circuit 18a but pass DC signals. The antenna ID circuit 18a illustratively includes a voltage-controlled current source 20a coupled to the second connector 16a, a PWR regulator 23a coupled to the first inductor, and a controller 21a coupled to the voltage-controlled current source and the PWR regulator.

As will be appreciated, the PWR regulator 23a comprises a power regulator. The power regulator may comprise a low drop out (LDO) regulator, a switch mode power supply (SMPS), or a shunt regulator. Any of these would perform the function of lowering the input voltage to a useable range by the controller 21a.

The controller 21a is configured to control the voltage-controlled current source 20a based upon the ID of the RF antenna element 17a. In some embodiments, the controller 21a includes a memory circuit configured to store the ID of the RF antenna element. In particular, the voltage-controlled current source 20a is configured to pulse or modulate the DC supply current by selectively controlling a current flow therethrough. In some embodiments, the modulation comprises a high-low current bit pattern equating to the binary string equating to the ID of the RF antenna element 17a (i.e. high-low-low-low-low 10000 for 16).

The antenna ID circuit illustratively includes a first ESD device 24a coupled between the first inductor 22a and a reference voltage (e.g. illustrated ground potential). In the illustrated embodiment, the first ESD device 24a comprises a pair of Zener diodes having respective cathodes coupled together.

Figure 4:
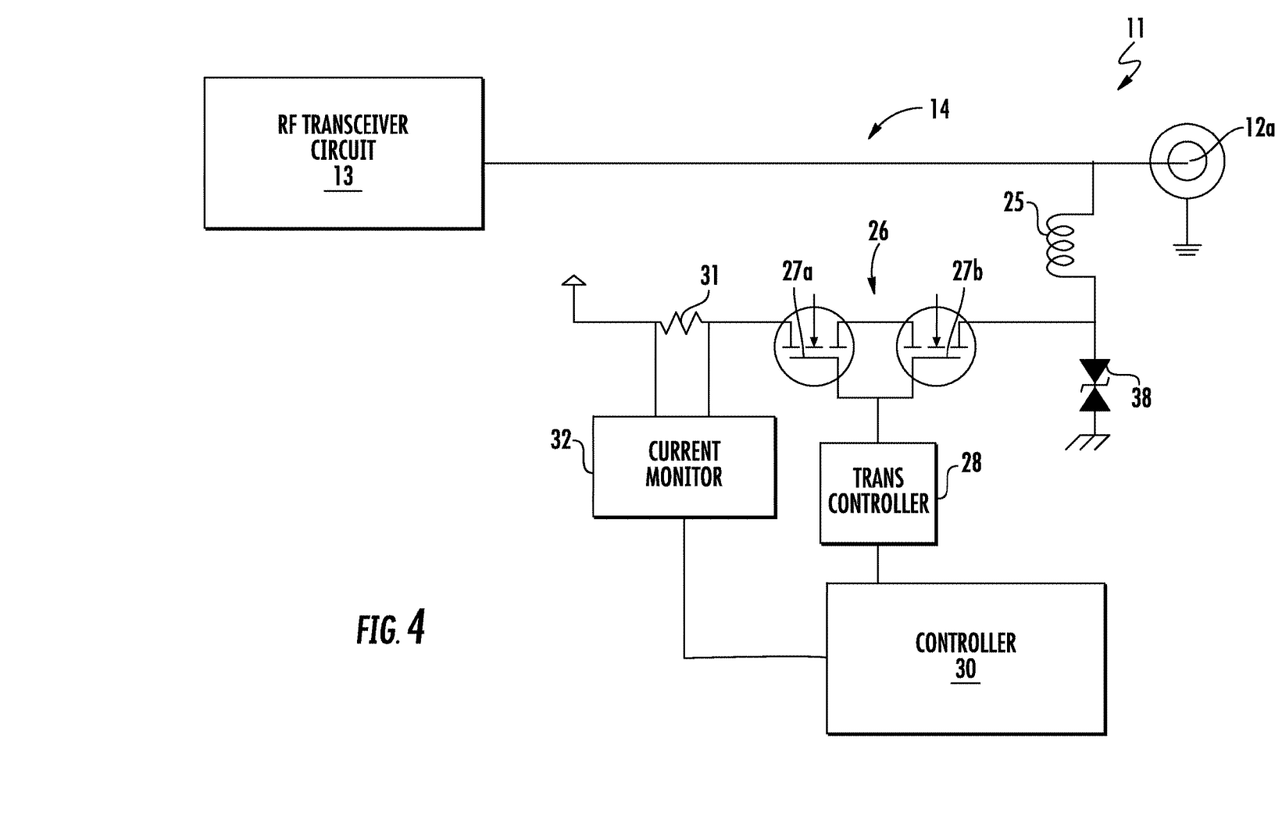
FIG. 4 is a schematic diagram of an example embodiment of an RF transceiver from the wireless communications device of FIG. 1 or 2.

As perhaps best seen in FIG. 4, the RF transceiver 11 illustratively includes an RF transceiver circuit 13 coupled to the plurality of first connectors 12a-12c. The RF transceiver circuit 13 may comprise one or more baseband processors (generating a baseband RF signal), one or more pre-amplifiers/amplifiers, one or more filters, one or more mixers, and one or module modulators.

The RF transceiver 11 illustratively includes a probe circuit 14 coupled between the plurality of first connectors 12a-12c and the RF transceiver circuit 13. The probe circuit 14 is configured to place a DC supply voltage on the plurality of first connectors 12a-12c. As will be appreciated, in some embodiments, external RF transmit/receive components (e.g. low noise amplifiers) may be coupled to one or more of the plurality of first connectors 12a-12c and be powered by the DC supply voltage.

The probe circuit 14 is configured to determine the ID of the RF antenna element 17a based upon the modulated DC supply current. In particular, the probe circuit 14 is configured to detect a current of the DC supply signal.

Moreover, the probe circuit 14 illustratively includes a second inductor 25 coupled to the plurality of first connectors 12a-12c, and a switch 26 coupled to the second inductor and configured to selectively apply the DC supply voltage to the plurality of first connectors 12a-12c. As with the first inductor 22a, the second inductor 25 is configured to block RF signals from passing in the probe circuit 14 and permit DC signals to pass.

The probe circuit 14 illustratively includes a sense resistor 31 coupled to the second inductor 25, and a current sensor 32 coupled across terminals of the sense resistor. The probe circuit 14 illustratively includes a controller 30 coupled to the current sensor 32 and configured to determine the ID of the RF antenna element 17 based upon the modulated DC supply current. The probe circuit 14 illustratively includes a second ESD device 38 coupled between the second inductor 25 and a reference voltage (e.g. illustrated ground potential).

Here, the switch 26 illustratively includes a pair of field-effect transistors (FETs) 27a-27b, each having conduction terminals coupled between the second inductor 25 and the sense resistor 31. The switch 26 illustratively includes a transistor controller circuit 28 coupled to the controller 30 and the control terminals of the FETs 27a-27b. The controller 30 is configured to open and close the FETs 27a-27b to selectively apply the DC supply voltage to the plurality of first connectors 12a-12c.

In some embodiments, the switch 26 can apply the DC supply voltage on power-up of the RF transceiver 11. In some embodiments where the RF transceiver 11 includes an accelerometer, the switch 26 can apply the DC supply voltage when the accelerometer detects movement exceeding a configurable threshold. Helpfully, the RF transceiver 11 can check for when one or more of the plurality of RF antenna assemblies 15a-15c are dislodged or not seated properly.

Also, for drawing clarity purposes, only a single first connector 12a is depicted in FIG. 4. In some embodiments, a switching mechanism (not shown) may be used to direct the DC supply voltage to the desired one of the plurality of first connectors 12a-12c, and to receive the modulated DC supply current. In other embodiments, each of the plurality of first connectors 12a-12c may have a respective probe circuit 14.

Advantageously, the RF transceiver 11 is configured to detect the placement of the plurality of RF antenna assemblies 15a-15c on the plurality of first connectors 12a-12c. The operating system (OS) or main processor of the RF transceiver 11 is configured to access the controller 30 for determining the correct IDs that need to be connected to the plurality of first connectors 12a-12c.

Of course, in embodiments where the plurality of first connectors 12a-12c can be configured or assigned to different operational frequency bands, the OS rearranges the needed placement of the plurality of RF antenna assemblies 15a-15c on the plurality of first connectors 12a-12c. Also, in these embodiments, the OS could simply reassign the different operational frequency bands to the proper first connectors 12a-12c. Helpfully, this can all be done without intervention from the user, without RF antenna assembly 15a-15c swapping of onerous software interaction.

In some embodiments where the RF transceiver 11 includes a display, the needed corrective repositioning of the plurality of RF antenna assemblies 15a-15c is displayed. For example, the display may prompt the user to swap the RF antenna assemblies 15a-15c on specific first connectors 12a-12c.

Another aspect is directed to an RF transceiver device 11 comprising plurality of first connectors 12a-12c, an RF transceiver circuit 13 coupled to the plurality of first connectors 12a-12c, and a probe circuit 14 coupled to the plurality of first connectors 12a-12c and configured to place a DC supply voltage on the plurality of first connectors 12a-12c. The RF transceiver device 11 is to be coupled to an RF antenna assembly 15a-15c comprising a second connector 16a configured to be mated with the plurality of first connectors 12a-12c, an RF antenna element 17a coupled to the second connector, and an antenna ID circuit 18a coupled to the second connector and configured to be powered from the DC supply voltage and modulate the DC supply current indicative of an ID of the RF antenna element. The probe circuit 14 is configured to determine the ID of the RF antenna element 17a based upon the modulated DC supply current.

Another aspect is directed to an RF antenna assembly 15a-15c to be coupled with an RF transceiver 11. The RF transceiver 11 illustratively includes a plurality of first connectors 12a-12c, an RF transceiver circuit 13 coupled to the plurality of first connectors 12a-12c, and a probe circuit 14 coupled to the plurality of first connectors 12a-12c and configured to place a DC supply voltage on the plurality of first connectors. The RF antenna assembly 15a-15c comprises a second connector 16a configured to be mated with the plurality of first connectors 12a-12c, an RF antenna element 17a coupled to the second connector, and an antenna ID circuit 18a coupled to the second connector and configured to be powered from the DC supply voltage and modulate a DC supply current indicative of an ID of the RF antenna element. The probe circuit 14 is configured to determine the ID of the RF antenna element 17a based upon the modulated DC supply current.

Yet another aspect is directed to a method of operating a wireless communications device 10 comprising an RF transceiver 11. The RF transceiver 11 illustratively includes plurality of first connectors 12a-12c, an RF transceiver circuit 13 coupled to the plurality of first connectors 12a-12c, and a probe circuit 14 coupled to the plurality of first connectors 12a-12c. The wireless communications device 10 includes an RF antenna assembly 15a-15c comprising a second connector 16a, an RF antenna element 17a coupled to the second connector, and an antenna ID circuit 18a coupled to the second connector. The method includes coupling the RF antenna assembly 15a-15c with the RF transceiver 11 by mating the second connector 16a with the plurality of first connectors 12a-12c, and operating the probe circuit 14 to place a DC supply voltage on the plurality of first connectors. The method comprises operating the antenna ID circuit 18a to be powered from the DC supply voltage and modulate a DC supply current indicative of an ID of the RF antenna element 17a, and determining the ID of the RF antenna element based upon the modulated DC supply current.

Figure 5:
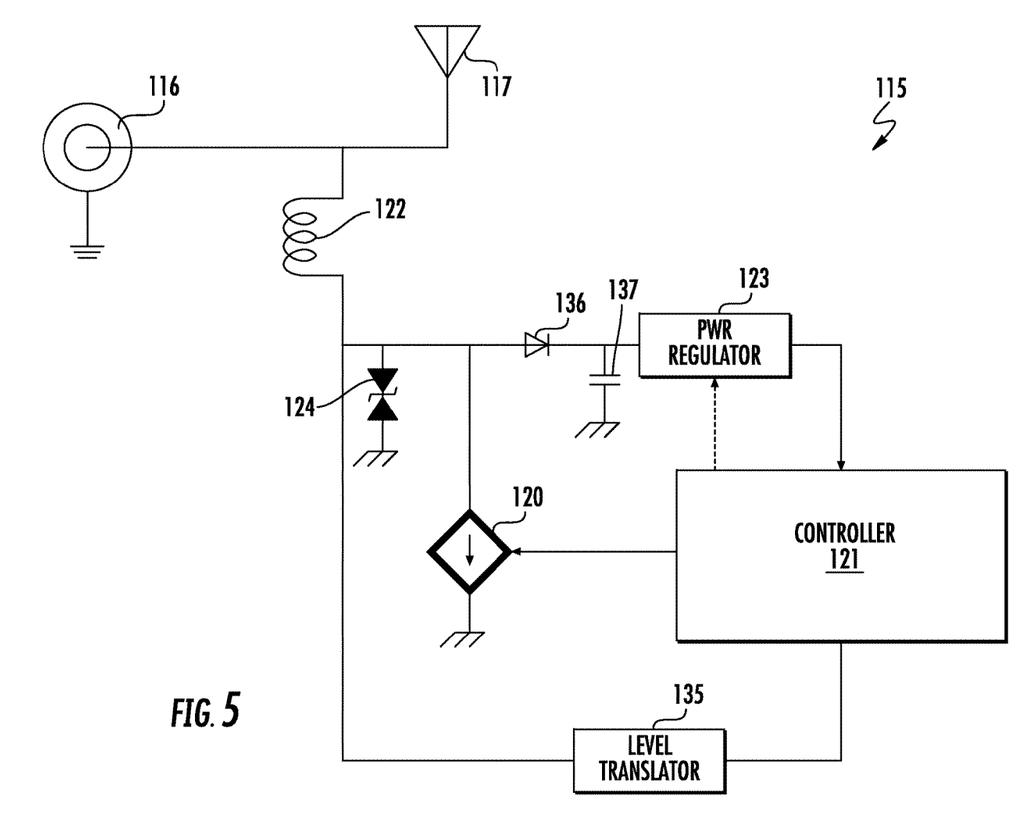
FIG. 5 is a schematic diagram of a second embodiment of the RF antenna assembly from the wireless communications device of FIG. 1 or 2.

Referring now additionally to FIG. 5, another embodiment of the RF antenna assembly 115 is now described. In this embodiment of the RF antenna assembly 115, those elements already discussed above with respect to FIGS. 1-4 are incremented by 100 and most require no further discussion herein. This embodiment differs from the previous embodiment in that this RF antenna assembly 115 illustratively includes level translator 135 coupled between the controller 121 and the first inductor 122. The RF antenna assembly 115 illustratively includes a diode 136 coupled between the first inductor 122 and the PWR regulator 123, and a capacitor 137 coupled between a cathode of the diode and a reference voltage (e.g. illustrated ground potential).

This embodiment of the RF antenna assembly 115 permits the controller 130 of the RF transceiver 111 to send communications to the controller 121 of the RF antenna assembly. This permits the stored ID of the RF antenna element 117 to be programmed. Also, this bi-directional communication can enable antenna element tuning, antenna beam steering, and internal antenna co-site mitigation.

This would be accomplished by the probe circuit 14 of the RF transceiver device 11. The transistors 27a-27b could be controlled to turn on/off modulating the DC supply voltage. The diode 136 and capacitor 137 of the RF antenna assembly 115 provide a "hold up circuit", which would allow the controller 121 to remain powered (order of milliseconds) during the turn on/off sequencing. The controller 121 would be able to detect the DC supply voltage modulation by way of the level translator 135. In essence, a message could be sent to the RF antenna assembly 115 by placing the ID circuit in a "program ID mode", then the RF transceiver device 11 could program a specific ID into non-volatile memory, which then could be read back by the RF transceiver 111 for verification purposes.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A wireless communications device comprising:
    a radio frequency (RF) transceiver comprising
        at least one first connector,
        an RF transceiver circuit coupled to said at least one first connector, and
        a probe circuit coupled to said at least one first connector and configured to place a direct current (DC) supply voltage on said at least one first connector; and
    an RF antenna assembly to be coupled with said RF transceiver comprising
        a second connector configured to be mated with said at least one first connector,
        an RF antenna element coupled to said second connector, and
        an antenna identification (ID) circuit coupled to said second connector and configured to be powered from the DC supply voltage and modulate a DC supply current indicative of an ID of said RF antenna element,
    said probe circuit configured to determine the ID of said RF antenna element based upon the modulated DC supply current.

2. The wireless communications device of claim 1 wherein said antenna ID circuit comprises:
    a voltage-controlled current source coupled to said second connector; and
    a controller configured to control said voltage-controlled current source based upon the ID of said RF antenna element.

3. The wireless communications device of claim 2 wherein said antenna ID circuit comprises:
    a first inductor coupled between said second connector and said controller; and
    a first electrostatic discharge (ESD) device coupled between said first inductor and a reference voltage.

4. The wireless communications device of claim 2 wherein said antenna ID circuit comprises:
    a first inductor coupled between said second connector and said controller; and
    a DC level translator coupled between said first inductor and said controller.

5. The wireless communications device of claim 1 wherein said at least one first connector comprises a plurality of first connectors.

6. The wireless communications device of claim 1 wherein said probe circuit comprises:
    a second inductor coupled to said at least one first connector;
    a sense resistor coupled to said second inductor; and
    a current sensor coupled to said sense resistor.

7. The wireless communications device of claim 6 wherein said probe circuit comprises a controller coupled to said current sensor and configured to determine the ID of said RF antenna element based upon the modulated DC supply current.

8. The wireless communications device of claim 6 wherein said probe circuit comprises a switch coupled to said second inductor and configured to selectively apply the DC supply voltage to said at least one first connector.

9. The wireless communications device of claim 6 wherein said probe circuit comprises a second ESD device coupled between said second inductor and a reference voltage.

10. A radio frequency (RF) transceiver device comprising:
at least one first connector;
an RF transceiver circuit coupled to said at least one first connector; and
a probe circuit coupled to said at least one first connector and configured to place a direct current (DC) supply voltage on said at least one first connector, the RF transceiver device to be coupled to an RF antenna assembly comprising
a second connector configured to be mated with said at least one first connector,
an RF antenna element coupled to the second connector, and
an antenna identification (ID) circuit coupled to the second connector and configured to be powered from the DC supply voltage and modulate a DC supply current indicative of an ID of the RF antenna element;
said probe circuit configured to determine the ID of the RF antenna element based upon the modulated DC supply current.

11. The RF transceiver device of claim 10 wherein said at least one first connector comprises a plurality of first connectors.

12. The RF transceiver device of claim 10 wherein said probe circuit comprises:
a second inductor coupled to said at least one first connector;
a sense resistor coupled to said second inductor; and
a current sensor coupled to said sense resistor.

13. The RF transceiver device of claim 12 wherein said probe circuit comprises a controller coupled to said current sensor and configured to determine the ID of the RF antenna element based upon the modulated DC supply current.

14. The RF transceiver device of claim 12 wherein said probe circuit comprises a switch coupled to said second inductor and configured to selectively apply the DC supply voltage to said at least one first connector.

15. A radio frequency (RF) antenna assembly to be coupled with an RF transceiver comprising at least one first connector, an RF transceiver circuit coupled to the at least one first connector, and a probe circuit coupled to the at least one first connector and configured to place a direct current (DC) supply voltage on the at least one first connector, the RF antenna assembly comprising:
a second connector configured to be mated with the at least one first connector;
an RF antenna element coupled to said second connector; and
an antenna identification (ID) circuit coupled to said second connector and configured to be powered from the DC supply voltage and modulate a DC supply current indicative of an ID of said RF antenna element, the probe circuit configured to determine the ID of said RF antenna element based upon the modulated DC supply current.

16. The RF antenna assembly of claim 15 wherein said antenna ID circuit comprises:
a voltage-controlled current source coupled to said second connector; and
a controller configured to control said voltage-controlled current source based upon the ID of the RF antenna element.

17. The RF antenna assembly of claim 16 wherein said antenna ID circuit comprises:
a first inductor coupled between said second connector and said controller; and
a first electrostatic discharge (ESD) device coupled between said first inductor and a reference voltage.

18. The RF antenna assembly of claim 16 wherein said antenna ID circuit comprises:
a first inductor coupled between said second connector and said controller; and
a DC level translator coupled between said first inductor and said controller.

19. A method of operating a wireless communications device comprising a radio frequency (RF) transceiver comprising at least one first connector, an RF transceiver circuit coupled to the at least one first connector, and a probe circuit coupled to the at least one first connector, and an RF antenna assembly comprising a second connector, an RF antenna element coupled to the second connector, and an antenna identification (ID) circuit coupled to the second connector, the method comprising:
coupling the RF antenna assembly with the RF transceiver by mating the second connector with the at least one first connector;
operating the probe circuit to place a direct current (DC) supply voltage on the at least one first connector;
operating the antenna ID circuit to be powered from a DC supply voltage and modulate a DC supply current indicative of an ID of the RF antenna element; and
determining the ID of the RF antenna element based upon the modulated DC supply current.

20. The method of claim 19 wherein the antenna ID circuit comprises:
a voltage-controlled current source coupled to the second connector; and
a controller configured to control the voltage-controlled current source based upon the ID of the RF antenna element.

21. The method of claim 20 wherein the antenna ID circuit comprises:
a first inductor coupled between the second connector and the controller; and
a first electrostatic discharge (ESD) device coupled between the first inductor and a reference voltage.

22. The method of claim 20 wherein the antenna ID circuit comprises:
a first inductor coupled between the second connector and the controller; and
a DC level translator coupled between the first inductor and the controller.

* * * * *